(12) United States Patent
Watahiki et al.

(10) Patent No.: US 10,848,088 B2
(45) Date of Patent: Nov. 24, 2020

(54) MOTOR CONTROL APPARATUS, MOTOR SYSTEM, MOTOR CONTROL METHOD, AND INTEGRATED CIRCUIT DEVICE

(71) Applicant: Nidec Corporation, Kyoto (JP)

(72) Inventors: Masanori Watahiki, Kyoto (JP); Tomonari Mori, Kyoto (JP); Tomoya Ueda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/461,844

(22) PCT Filed: Dec. 8, 2017

(86) PCT No.: PCT/JP2017/044179
§ 371 (c)(1),
(2) Date: May 17, 2019

(87) PCT Pub. No.: WO2018/123516
PCT Pub. Date: Jul. 5, 2018

(65) Prior Publication Data
US 2019/0372496 A1    Dec. 5, 2019

(30) Foreign Application Priority Data

Dec. 27, 2016 (JP) ................................ 2016-253596

(51) Int. Cl.
*H02P 21/05* (2006.01)
*H02P 21/22* (2016.01)
*H02P 27/08* (2006.01)

(52) U.S. Cl.
CPC .............. *H02P 21/05* (2013.01); *H02P 21/22* (2016.02); *H02P 27/08* (2013.01)

(58) Field of Classification Search
CPC .......... H02P 21/05; H02P 21/22; H02P 21/06; H02P 25/22; H02P 29/50
See application file for complete search history.

(56) References Cited

U.S. PATENT DOCUMENTS

| 2013/0099707 | A1 | 4/2013 | Okubo |
| 2014/0191699 | A1* | 7/2014 | Dixon ..................... H02P 21/05 |
| | | | 318/503 |

(Continued)

FOREIGN PATENT DOCUMENTS

| JP | 2005-253155 A | 9/2005 |
| JP | 2016-025810 A | 2/2016 |

OTHER PUBLICATIONS

Official Communication issued in International Patent Application No. PCT/JP2017/044179, dated Feb. 27, 2018.

*Primary Examiner* — Zoheb S Imtiaz
(74) *Attorney, Agent, or Firm* — Keating & Bennett (57) ABSTRACT

A motor control apparatus includes a first circuit that determines a d-axis 0th-order current and a q-axis 0th-order current, a second circuit that determines a d-axis 6th-order harmonic current and a q-axis 6th-order harmonic current according to a position of the rotor, and a third circuit that determines, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value. An amplitude $i_{d6}$ and a phase $\theta_{d6}$ of the d-axis 6th-order harmonic current and an amplitude $i_{q6}$ and a phase $\theta_{q6}$ of the q-axis 6th-order harmonic current have values that decrease an electrical angle 6th-order radial force as compared with a case in which both of the amplitude $i_{d6}$ and the amplitude $i_{q6}$ are zero and decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force.

7 Claims, 4 Drawing Sheets

(56) References Cited

U.S. PATENT DOCUMENTS

2016/0315577 A1* 10/2016 Suzuki .................... H02P 21/05
2017/0288588 A1* 10/2017 Tachibana ............... H02P 21/05
2018/0191285 A1*  7/2018 Shigeta ................... H02P 21/22

* cited by examiner

Fig.4B

MOTOR CONTROL APPARATUS, MOTOR SYSTEM, MOTOR CONTROL METHOD, AND INTEGRATED CIRCUIT DEVICE

CROSS REFERENCE TO RELATED APPLICATIONS

This is the U.S. national stage of application No. PCT/JP2017/044179, filed on Dec. 8, 2017, and priority under 35 U.S.C. § 119(a) and 35 U.S.C. § 365(b) is claimed from Japanese Application No. 2016-253596, filed Dec. 27, 2016; the entire contents of which are incorporated herein by reference.

1. FIELD OF THE INVENTION

The present disclosure relates to a motor control apparatus, a motor system, and a motor control method for a permanent-magnet synchronous motor. The present disclosure also relates to an integrated circuit device used for such motor control.

2. BACKGROUND

One cause of the vibration and noise of a motor is that an electromagnetic excitation force generated in the radial direction of the motor excites the vibration of the stator. The electromagnetic excitation force in the radial direction is referred to as a "radial force" and is generated between the teeth of the rotor and the stator. The radial force contains a plurality of order components (harmonic components) that vibrate at different time intervals as the rotor rotates. Among the plurality of order components, an electrical angle 6th-order radial force (hereinafter, it may be simply referred to as "6th order radial force") excites significant vibrations in an annular mode of the stator, so that it may cause large vibration and noise due to resonance.

As an example, a motor control apparatus that reduces a 6th-order radial force by superposing an electrical angle 6th-order harmonic current on at least one of d-axis and q-axis currents has been known.

According to the research of the inventors, the motor control apparatus as disclosed above can suppress the 6th-order radial force but may increase an electrical angle 8th-order radial force (hereinafter sometimes simply referred to as "8th-order radial force". Depending on the structure and the driving state of the motor, the 8th-order radial force can significantly increase the vibration and noise of the motor due to resonance.

SUMMARY

A motor control apparatus according to an example embodiment of the present disclosure is a motor control apparatus that controls a permanent-magnet synchronous motor including a rotor and a stator. The apparatus includes a first circuit that determines a d-axis 0th-order current and a q-axis 0th-order current, a second circuit that determines a d-axis 6th-order harmonic current and a q-axis 6th-order harmonic current according to a position of the rotor, and a third circuit that determines, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value. An amplitude $i_{d6}$ and a phase $\theta_{d6}$ of the d-axis 6th-order harmonic current and an amplitude $i_{q6}$ and a phase $\theta_{q6}$ of the q-axis 6th-order harmonic current have values that decrease an electrical angle 6th-order radial force as compared with a case in which both of the amplitude $i_{d6}$ and the amplitude $i_{q6}$ are zero and decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force.

A motor system according to an example embodiment of the present disclosure includes the motor control apparatus described above and a permanent-magnet synchronous motor including a rotor and a stator.

A motor control method according to an example embodiment of the present disclosure is a motor control method for controlling a permanent-magnet synchronous motor including a rotor and a stator. The method includes the steps of determining a d-axis 0th-order current and a q-axis 0th-order current, determining a d-axis 6th-order harmonic current and a q-axis 6th-order harmonic current according to a position of the rotor, the step determining amplitudes $i_{d6}$ and $i_{q6}$ and phases $\theta_{d6}$ and $\theta_{q6}$ so as to decrease an electrical angle 6th-order radial force as compared with a case in which both of the amplitude $i_{d6}$ and the amplitude $i_{q6}$ are zero and to decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force, and determining, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value.

An integrated circuit device according to an example embodiment of the present disclosure is an integrated circuit device to control a permanent-magnet synchronous motor including a rotor and a stator. The integrated circuit device includes a signal processor and a memory. The memory stores a program to cause the signal processor to execute determining a d-axis 0th-order current and a q-axis 0th-order current, determining a d-axis 6th-order harmonic current and a q-axis 6th-order harmonic current according to a position of the rotor, and determining, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value. An amplitude $i_{d6}$ and a phase $\theta_{d6}$ of the d-axis 6th-order harmonic current and an amplitude $i_{q6}$ and a phase $\theta_{q6}$ of the q-axis 6th-order harmonic current have values that decrease an electrical angle 6th-order radial force as compared with a case in which both of the amplitude $i_{d6}$ and the amplitude $i_{q6}$ are zero and decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force.

The above and other elements, features, steps, characteristics and advantages of the present disclosure will become more apparent from the following detailed description of the example embodiments with reference to the attached drawings.

DETAILED DESCRIPTION

In a permanent-magnet synchronous motor including a rotor and a stator, the magnetic flux passing through air gaps between the teeth of the rotor and the teeth of the stator flows mainly in the radial direction and the circumferential direction. This causes not only a force in the circumferential direction (torque) but only a force in the radial direction (a radial force) between the stator and the rotor. These forces are referred to as "electromagnetic force". The magnetic flux that causes the electromagnetic force contains a magnetic flux component due to a permanent magnet in the rotor and a magnetic flux component formed by energizing the winding of the stator. Since the magnitude of the magnetic flux component passing through the teeth changes spatially and temporally, the electromagnetic force also changes spatially and temporally. This causes electromagnetic vibration. The vibration and noise due to the radial force during the driving of the motor can be reduced by superposing a harmonic current with an amplitude and a phase that satisfy specific conditions on the current flowing through the winding of the stator.

The apparatus disclosed in Japanese Unexamined Patent Application Publication No. 2016-25810 superposes an electrical angle 6th-order harmonic current (hereinafter sometimes simply referred to as "6th-order harmonic current") on at least one of normal d-axis and q-axis currents (0th-order currents) in order to reduce the electrical 6th-order radial force. This apparatus corrects the amplitude of the 6th-order harmonic current, but this is based on the premise that the phases of the 6th-order harmonic currents on the d-axis and the q-axis are set at the same value. In contrast, in an example embodiment of the present disclosure, both of the amplitudes and the phases of the 6th-order harmonic currents on the d-axis and the q-axis are determined so as to satisfy specific conditions (conditions of constraint) in order to suppress an increase in the 8th-order radial force that can be generated by superposition of the 6th-order harmonic current.

Before describing example embodiments of the present disclosure, the cause of generation of the radial force will be described.

The magnetic flux density B between the teeth of the stator is expressed as Eq. 1, $$B = \frac{\phi}{S} = \frac{\Psi}{NS} \quad [\text{Eq. 1}]$$

where $\phi$ is the magnetic flux, S is the area of the end of the teeth, $\psi$ is the interlinkage magnetic flux, and N is the number of turns of the winding.

The magnetic flux density B includes a radial magnetic flux density $B_r$ and a circumferential magnetic flux density $B_\theta$. A radial force $F_r$ that acts on the teeth is expressed as Eq. 2 using Maxwell's stress formula, $$F_r = \int \frac{B_r^2 - B_0^2}{2\mu_0} dS \quad [\text{Eq. 2}]$$

where $\mu_0$ is space permeability.

In general, the radial magnetic flux density $B_r$ and the circumferential magnetic flux density Bo have the relationship $B_r^2 \gg B_\theta^2$. Thus, assuming that the magnetic flux density B is uniformly distributed in an integrated plane, the radial force $F_r$ can be approximated as expressed by Eq. 3.

$$F_r = \int \frac{B_r^2 - B_\theta^2}{2\mu_0} dS \cong \frac{B_r^2}{2\mu_0} S \quad [\text{Eq. 3}]$$

The approximate expression of the radial force $F_r$ can further be transformed.

$$F_r \cong \frac{B_r^2}{2\mu_0} S = \frac{1}{2\mu_0} \left(\frac{\Psi}{NS}\right)^2 S = \frac{\Psi^2}{2\mu_0 N^2 S} \quad [\text{Eq. 4}]$$

As is apparent from Eq. 4, the radial force $F_r$ acting on the teeth is proportional to the square of the interlinkage magnetic flux $\psi$ of the teeth. Since the interlinkage magnetic flux $\psi$ is expressed by a linear combination of a permanent magnet component $\psi_m$ formed by the permanent magnet of the rotor and a current component $\psi_i$ formed by the electric current flowing through the winding of the stator, Eq. 5 holds.

$$\psi = \psi_m + \psi_i \quad [\text{Eq. 5}]$$

Accordingly, in a permanent-magnet synchronous motor driven in three phases U, V, and W, the radial forces $F_{rU}$, $F_{rV}$, and $F_{rW}$ of the teeth in U, V, and W phases are expressed as Eq. 6.

$$\begin{bmatrix} F_{rU} \\ F_{rV} \\ F_{rW} \end{bmatrix} = \frac{1}{2\mu_0 N^2 S} \begin{bmatrix} (\Psi_{mU} + \Psi_{iU})^2 \\ (\Psi_{mV} + \Psi_{iV})^2 \\ (\Psi_{mW} + \Psi_{iW})^2 \end{bmatrix} = A \begin{bmatrix} (\Psi_{mU} + \Psi_{iU})^2 \\ (\Psi_{mV} + \Psi_{iV})^2 \\ (\Psi_{mW} + \Psi_{iW})^2 \end{bmatrix} \quad [\text{Eq. 6}]$$

Where $\psi mU$, $\psi mV$, and $\psi mW$ are respectively, interlinkage magnetic flux in U, V, and W phases due to the permanent magnet, $\psi iU$, $\psi iV$, and $\psi iW$ are respectively interlinkage magnetic flux in U, V, and W phases due to the winding current, and constant A is the reciprocal of $2\mu 0 N 2 S$.

By performing dq/UVW conversion on Eq. 6, the radial forces of the teeth can be described as the functions of a d-axis current $i_{d0}$ and a q-axis current $i_{q0}$. The d-axis and the q-axis are synchronous rotational coordinates that rotate together with the rotor. The letter "d" of the d-axis is the capital letter of "direct" and points to the north pole of the permanent magnet of the rotor. The letter "q" of the q-axis is the capital letter of "quadrature" and points to a direction perpendicular to the d-axis at an electrical angle of 90°.

The U-phase radial force $F_{rU}$ is expressed as the following equation using the d-axis magnetic flux $\psi_d$ and the q-axis magnetic flux $\psi_q$.

$$F_{rU} = A\Psi_U^2 = A\left\{\sqrt{\frac{2}{3}}\cos\theta\cdot\Psi_d - \sqrt{\frac{2}{3}}\sin\theta\cdot\Psi_q\right\}^2 \quad [\text{Eq. 7}]$$

where θ is an electrical angle indicating the rotational position of the rotor. The d-axis magnetic flux $\psi_d$ and the q-axis magnetic flux $\psi_q$ are expressed as the following equation.

$$\begin{bmatrix}\Psi_d \\ \Psi_q\end{bmatrix} = \begin{bmatrix}\Psi_{md0} + \Psi_{md6}\cos 6\theta \\ \Psi_{mq6}\sin 6\theta\end{bmatrix} + \begin{bmatrix}L_{d0} & 0 \\ 0 & L_{q0}\end{bmatrix}\begin{bmatrix}i_{d0} \\ i_{q0}\end{bmatrix} \quad [\text{Eq. 8}]$$

where $\psi_{md0}$ and $\psi_{md6}$ are respectively the amplitudes of the 0th-order component and the 6th-order component of the d-axis interlinkage magnetic flux generated due to the permanent magnet, $\psi_{mq6}$ is the amplitude of the 6th-order component of the q-axis interlinkage magnetic flux generated due to the permanent magnet, $L_{d0}$ and $L_{q0}$ are respectively the 0th-order component of d-axis self-inductance and the 0th-order component of q-axis self-inductance, and $i_{d0}$ and $i_{q0}$ are respectively a d-axis current and a q-axis current (0th-order currents) on which no harmonic current is superposed.

Even when the 6th-order harmonic current is not superposed on the winding current, interlinkage magnetic flux of the 6th-order harmonic component, which changes according to the rotational position θ of the rotor, is generated on the d and q coordinates. The 6th-order harmonic component in the first term on the right-hand side of Eq. 8 is generated because the U-, V-, and W-phase interlinkage magnetic fluxes $\psi_{mU}$, $\psi_{mV}$, and $\psi_{mW}$ generated due to the permanent magnet of the rotor are approximately expanded as the sum of the 1st, 5th, and 7th-order harmonic components that change according to the rotational position θ of the rotor. This expansion is expressed as the following equation.

$$\begin{bmatrix}\Psi_{mU} \\ \Psi_{mV} \\ \Psi_{mW}\end{bmatrix} = \quad [\text{Eq. 9}]$$

$$\begin{bmatrix}\Psi_{m1}\cos(\theta) + \Psi_{m5}\cos(5\theta) + \Psi_{m7}\cos(7\theta) \\ \Psi_{m1}\cos\left(\theta - \frac{2\pi}{3}\right) + \Psi_{m5}\cos\left(5\left(\theta - \frac{2\pi}{3}\right)\right) + \Psi_{m7}\cos\left(7\left(\theta - \frac{2\pi}{3}\right)\right) \\ \Psi_{m1}\cos\left(\theta + \frac{2\pi}{3}\right) + \Psi_{m5}\cos\left(5\left(\theta + \frac{2\pi}{3}\right)\right) + \Psi_{m7}\cos\left(7\left(\theta + \frac{2\pi}{3}\right)\right)\end{bmatrix}$$

The reason why Eq. 9 does not include a third harmonic component is that the total sum of the U-, V-, and W-phase interlinkage magnetic fluxes $\psi_{mU}$, $\psi_{mV}$, and $\psi_{mW}$ is zero. Performing dq/UVW conversion on Eq. 9 gives the first term on the right-hand side of Eq. 8. The first term on the right-hand side of Eq. 8 indicates an interlinkage magnetic flux component due to the permanent magnet of the rotor, and the 2nd term on the right-hand side indicates an interlinkage magnetic flux component due to the winding current. In the interlinkage magnetic flux component due to the winding current in the 2nd term on the right-hand side, the interference between the harmonic of the inductance and the d- and q-axis currents $i_{d0}$ and $i_{q0}$ is ignored.

In the example embodiment of the present disclosure, the interlinkage magnetic flux component in the 2nd term of Eq. 8 is adjusted to an appropriate value by controlling the winding current. Specifically, a d-axis 6th-order harmonic current and a q-axis 6th-order harmonic current are respectively superposed on the normal d-axis current $i_{d0}$ and q-axis current $i_{q0}$. Let $i_{d0}$ and $i_{q0}$ be respectively a normal d-axis current and a normal q-axis current (0th-order currents) before a harmonic current is superposed thereon. The d-axis current $i_{d0}$ and the q-axis current $i_{q0}$ can be determined by a known vector control operation according to a torque command value and a speed command value given from the outside. When the motor is controlled based on the thus-determined 0th-order currents (d- and q-axis currents $i_{d0}$ and $i_{q0}$), the 6th-order radial force described above is generated. In the example embodiment of the present disclosure, the d-axis 6th-order harmonic current and the q-axis 6th-order harmonic current are superposed so as to reduce the 6th-order radial force. At that time, the amplitude and the phase of the 6th-order harmonic current is given a specific relation (constraint condition) so as to suppress an increase in the 8th-order radial force.

The d-axis current $i_d$ and the q-axis current $i_q$ are expressed as the following equation, $$\begin{bmatrix}i_d \\ i_q\end{bmatrix} = \begin{bmatrix}i_{d0} \\ i_{q0}\end{bmatrix} + \begin{bmatrix}i_{d6}\cos(6\theta + \theta_{d6}) \\ i_{q6}\sin(6\theta + \theta_{q6})\end{bmatrix} \quad [\text{Eq. 10}]$$

where $i_{d0}\cos(6\theta+\theta_{d6})$ is the d-axis 6th-order harmonic current, and $i_{q0}\cos(6\theta+\theta_{q6})$ is the q-axis 6th-order harmonic current.

If the d-axis current $i_{d0}$ and the q-axis current $i_{q0}$ in Eq. 8 described above are replaced with the d-axis current $i_d$ and the q-axis current $i_q$ in Eq. 10, the d-axis magnetic flux $\psi_d$ and the q-axis magnetic flux $\psi_q$ can be regarded as the functions of the amplitude and the phase of the d-axis 6th-order harmonic current and the q-axis 6th-order harmonic current. This allows adjusting the U-phase radial force $F_{rU}$ in Eq. 7 using the amplitudes and the phases of the d-axis 6th-order harmonic current and the q-axis 6th-order harmonic current.

In the example embodiment of the present disclosure, $L_{d0} \times i_{d6}$ is equal to $L_{q0} \times i_{q6}$, and the difference between the phase $\theta_{d6}$ of the d-axis 6th-order harmonic current and the phase $\theta_{q6}$ of the q-axis 6th-order harmonic current is equal to π. Thus, by determining the amplitude and the phase, an increase in the 8th-order radial force can be suppressed. It can be said that this condition is a constraint for suppressing the increase in 8th-order radial force.

The expression "A is equal to B" in the present disclosure is not limited to the perfect match between A and B and indicates that $|A-B|/(A+B)$ is in the range of 0 or more and 0.1 or less.

Suppression of Increase in 8th Radial Force

The reason why the increase in the 8th-order radial force is suppressed by the above constraint condition will be described.

When the U-phase radial force $F_{rU}$ is obtained from Eq. 7 using Eq. 10 substituted into Eq. 8, $F_{rU}$ is expressed as the sum of the 0th, 2nd, 4th, 6th, 8th, . . . radial forces. Among them, the 8th-order radial force $F'_{r8}$ is expressed as Eq. 11.

$$F'_{r8} = F_{r8} + F_{d8} \cdot I_{d6} + F_{q8} \cdot I_{q6} = \quad [\text{Eq. 11}]$$

$$\frac{A}{3}(L_{d0}I_{d0} + \Psi_{md0})\{(\Psi_{md6} + \Psi_{mq6})\cos 8\theta +$$

-continued
$$L_{d0}i_{d6}\cos(8\theta+\theta_{d6})+L_{q0}i_{q6}\cos(8\theta+\theta_{q6})\}+$$
$$\frac{A}{3}(L_{q0}I_{q0})\{(\Psi_{md6}+\Psi_{mq6})\sin 8\theta - L_{d0}i_{d6}\sin(8\theta+\theta_{d6})-$$
$$L_{q0}i_{q6}\sin(8\theta+\theta_{q6})\}$$

In the equation in the first line of Eq. 11, the first term on the right-hand side is an electrical angle 8th-order radial force in the case where a harmonic current is not superposed. In contrast, the second term on the right-hand side is an electrical angle 8th-order radial force generated by superposition of a d-axis 6th-order harmonic current, and the third term on the right-hand side is an electrical angle 8th-order radial force generated by superposition of a q-axis 6th-order harmonic current, where $F_{d8}$ and $F_{q8}$ are constants determined according to motor driving conditions.

In an example embodiment of the present disclosure, the relations in Eq. 12 and Eq. 13 are satisfied in order to suppress an increase in the 8th-order radial force $F'_{r8}$ due to superposition of harmonic current.

$$L_{d0}i_{d6}=L_{q0}i_{q6} \quad [\text{Eq. 12}]$$

$$\theta_{d6}=\theta_{q6}+\pi \quad [\text{Eq. 13}]$$

If the amplitudes $i_{d6}$ and $i_{q6}$ and the phases $\theta_{d6}$ and $\theta_{q6}$ of the 6th-order harmonic current are set so as to satisfy the relations in Eq. 12 and Eq. 13, the two terms in Eq. 11 indicating the 8th-order radial force $F'_{r8}$ cancel each other.

$$\{L_{d0}i_{d6}\cos(8\theta+\theta_{d6})+L_{q0}i_{q6}\cos(8\theta+\theta_{q6})\} \quad [\text{Eq. 14}]$$

Likewise, the following two terms in Eq. 11 indicating the 8th-order radial force $F'_{r8}$ also cancel each other.

$$\{-L_{d0}i_{d6}\sin(8\theta+\theta_{d6})-L_{q0}i_{q6}\sin(8\theta+\theta_{q6})\} \quad [\text{Eq. 15}]$$

This allows reducing the increment of the 8th-order radial force due to superposition of the 6th-order harmonic current to zero. The increment of the 8th-order radial force due to superposition of the 6th-order harmonic current does not need to be zero, and the 8th-order radial force can be decreased depending on conditions as compared with a case in which the 6th-order harmonic current is not superposed.

In the example embodiment of the present disclosure, $L_{d0}\times i_{d6}$ and $L_{q0}\times i_{q6}$ do not need to match exactly, as described above. Furthermore, the difference between the phase $\theta_{d6}$ of the d-axis 6th-order harmonic current and the phase $\theta_{q6}$ of the q-axis 6th-order harmonic current do no need to match exactly. In other words, when $|L_{d0}\times i_{d6}-L_{q0}\times i_{q6}|/(L_{d0}\times i_{d6}+L_{q0}\times i_{q6})$ is in the range of 0 or more and 0.1 or less, and $|(\theta_{d6}-\theta_{q6})-\pi|/[(\theta_{d6}-\theta_{q6})+\pi]$ is in the range of 0 or more and 0.1 or less, the beneficial effect of suppressing an increase in the 8th-order radial force due to superposition of the 6th-order harmonic current can be sufficiently obtained.

Decrease in 6th Radial Force

In the example embodiment of the present disclosure, the amplitude and the phase of the harmonic current are further adjusted so as to decrease the 6th-order radial force under the above constraint condition. The following describes this point. In the example embodiment of the present disclosure, the 6th-order radial force $F'_{r6}$ can be expressed as Eq. 16.

$$F'_{r6} = F_{r6} + F_{d6} \cdot I_{d6} + F_{q6} \cdot I_{q6} = \quad [\text{Eq. 16}]$$
$$f_{r6}\cos(6\theta+\theta_{r6}) + F_{d6}\{i_{d6}\cos(6\theta+\theta_{d6})\}+$$
$$F_{q6}\{i_{q6}\sin(6\theta+\theta_{q6})\} = f_{r6}\cos(6\theta+\theta_{r6})+$$

-continued
$$\sqrt{(F_{d6}i_{d6})^2+(F_{q6}i_{q6})^2-2(F_{d6}i_{d6})(F_{q6}i_{q6})\sin(\theta_{d6}-\theta_{q6})}$$
$$\cos\left(6\theta+\tan^{-1}\left\{\frac{(F_{d6}i_{d6})\sin(\theta_{d6})-(F_{q6}i_{q6})\cos(\theta_{q6})}{(F_{d6}i_{d6})\cos(\theta_{d6})+(F_{q6}i_{q6})\sin(\theta_{q6})}\right\}\right)$$

The right-hand side of Eq. 16 is expressed as the sum of the 6th-order radial force $f_{r6}\cdot\cos(6\theta+\theta_{r6})$, which is generated between the rotor and the stator when a d-axis 0th-order current and a q-axis 0th-order current on which no harmonic current is superposed flow through the winding of the stator, and the 6th-order radial force generated due to the 6th-order harmonic current, that is, $F_{d6}\cdot i_{d6}\cos(6\theta+\theta_{d6})+F_{q6}\cdot i_{q6}\cos(6\theta+\theta_{q6})$, where $F_{d6}$ and $F_{q6}$ are constants determined depending on motor driving conditions.

Since the second term+the third term on the right-hand side of the first line in Eq. 16 has an opposite phase relationship to the 6th-order radial force of the first term on the right-hand side, the total 6th-order radial force $F'_{r6}$ can be made smaller than the 6th-order radial force $F_{r6}$.

If $i_{d6}$, $i_{q6}$, $\theta_{d6}$, and $\theta_{q6}$ are determined so as to minimize the 6th-order radial force $F'_{r6}$ in disregard of the constraint conditions in Eq. 12 and Eq. 13, superposition of a 6th-order harmonic current having the thus-determined $i_{d6}$, $i_{q6}$, $\theta_{d6}$, and $\theta_{q6}$ significantly increases the 8th-order radial force $F'_{r8}$. Specifically, when $i_{d6}$, $i_{q6}$, $\theta_{d6}$, and $\theta_{q6}$ which minimize the 6th-order radial force $F'_{r6}$ are substituted into Eq. 11, the amplitude of the term of sin 8θ becomes twice. The example embodiment of the present disclosure can suppress such an increase in the 8th-order radial force $F'_{r8}$.

Since the values $i_{d6}$, $i_{q6}$, $\theta_{d6}$, and $\theta_{q6}$ in Eq. 16 satisfy the relations (constraint conditions) of Eq. 12 and Eq. 13, FIG. 16 can be transformed to Eq. 17.

$$F'_{r6} = f_{r6}\cos(6\theta+\theta_{r6}) + \sqrt{(F_{d6}i_{d6})^2+\left(F_{q6}\frac{L_{d0}}{L_{q0}}i_{d6}\right)^2} \quad [\text{Eq. 17}]$$
$$\cos\left(6\theta+\tan^{-1}\left\{\frac{(F_{d6}i_{d6})\sin(\theta_{d6})+\left(F_{q6}\frac{L_{d0}}{L_{q0}}i_{d6}\right)\cos(\theta_{d6})}{(F_{d6}i_{d6})\cos(\theta_{d6})-\left(F_{q6}\frac{L_{d0}}{L_{q0}}i_{d6}\right)\sin(\theta_{d6})}\right\}\right)$$

Eq. 17 can be further transformed to Eq. 18.

$$F'_{r6} = f_{r6}\cos(6\theta+\theta_{r6}) + i_{d6}\sqrt{F_{d6}^2+\left(F_{q6}\frac{L_{d0}}{L_{q0}}\right)^2} \quad [\text{Eq. 18}]$$
$$\cos\left(6\theta+\tan^{-1}\left\{\frac{F_{d6}\sin(\theta_{d6})+\left(F_{q6}\frac{L_{d0}}{L_{q0}}\right)\cos(\theta_{d6})}{F_{d6}\cos(\theta_{d6})-\left(F_{q6}\frac{L_{d0}}{L_{q0}}\right)\sin(\theta_{d6})}\right\}\right)$$

The first term on the right-hand side in Eq. 18 is a component due to the 0th-order current, and the second term is a component due to the 6th-order harmonic current. If the values of $i_{d6}$ and $\theta_{d6}$ are determined so as to satisfy Eq. 19 and Eq. 20, the 6th-order radial force $F'_{r6}$ becomes zero.

$$f_{r6} = -i_{d6}\sqrt{F_{d6}^2+\left(F_{q6}\frac{L_{d0}}{L_{q0}}\right)^2} \quad [\text{Eq. 19}]$$

$$\theta_{r6} = \tan^{-1}\left\{\frac{F_{d6}\sin(\theta_{d6}) + \left(F_{q6}\frac{L_{d0}}{L_{q0}}\right)\cos(\theta_{d6})}{F_{d6}\cos(\theta_{d6}) - \left(F_{q6}\frac{L_{d0}}{L_{q0}}\right)\sin(\theta_{d6})}\right\}$$ [Eq. 20]

Even if the values on both sides of the equal signs in Eq. 19 and Eq. 20 do not match exactly, the 6th-order radial force $F'_{r6}$ can be brought close to zero. In other words, it is only required that the relation "the value on the right-hand side is equal to the value on the left-hand-side" holds in Eq. 19 and Eq. 20. This relation is not limited to exact match between A and B in the expression "A is equal to B", as described above, and it is only required that |A−B|/(A+B) is within the range of 0 or more and 0.1 or less.

Figure 1:
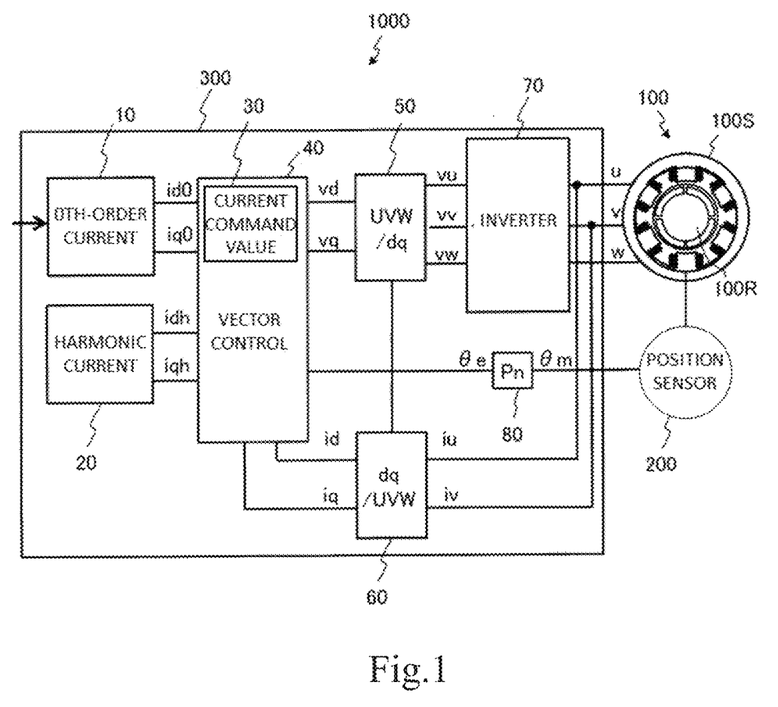
FIG. 1 is a schematic diagram illustrating the configuration of a motor control system according to a non-limiting example embodiment of the present disclosure.

Referring to FIG. 1, a non-limiting example embodiment of a motor control system of the present disclosure will be described. In the illustrated example, a motor control system 1000 of the present example embodiment includes a permanent-magnet synchronous motor 100 including a rotor 100R and a stator 100S, a position sensor 200 for measuring or estimating the position of the rotor 100R, and a motor control apparatus 300 that controls the permanent-magnet synchronous motor 100.

The configuration of the permanent-magnet synchronous motor 100 is not limited. The permanent-magnet synchronous motor 100 may be a surface permanent magnet (SPM) motor in which a permanent magnet is mounted on the surface of the rotor 100R or an interior permanent magnet (IPM) motor in which a permanent magnet is embedded in the rotor 100R. The winding of the stator 100S is not limited to concentrated winding but may be distributed winding. Typical examples of the position sensor 200 include magnetic sensors, such as a Hall effect sensor and a Hall integrated circuit (IC), a rotary encoder, and a resolver. The position sensor 200 is not absolutely necessary. A configuration for estimating the position of the rotor 100R without a sensor can be employed.

The motor control apparatus 300 includes a first circuit 10 that determines 0th-order currents (a d-axis 0th-order current $i_{d0}$ and a q-axis 0th-order current $i_{q0}$), a second circuit 20 that determines harmonic currents (a d-axis 6th-order harmonic current $i_{dh}$ and a q-axis 6th-order harmonic current $i_{qh}$) according to the position of the rotor 100R, and a third circuit 30 that determines a current command value by known vector control.

The third circuit 30 respectively determines a value obtained by superposing the d-axis 6th-order harmonic current $i_{dh}$ on the d-axis 0th-order current $i_{d0}$ and a value obtained by superposing the q-axis 6th-order harmonic current $i_{qh}$ on the q-axis 0th-order current $i_{q0}$ as a d-axis current command value $i_d$ and a q-axis current command value $i_q$. In the illustrated example, the third circuit 30 is included in a vector control circuit 40 of the motor control apparatus 300. The vector control circuit 40 respectively determines a d-axis voltage command value $v_d$ and a q-axis voltage command value $v_q$ based on the d-axis current command value $i_d$ and the q-axis current command value $i_q$.

The motor control apparatus 300 further includes a first conversion circuit 50 that performs UVW/dq conversion, a second conversion circuit 60 that performs dq/UVW conversion, an inverter 70, and a circuit 80 that converts a mechanical angle (θm) that the output of the position sensor 200 indicates to an electrical angle (θe). The first conversion circuit 50 generates a U-phase voltage command value vu, a V-phase voltage command value vv, and a W-phase voltage command value vw from the d-axis voltage command value $v_d$ and the q-axis voltage command value $v_q$ and outputs the command values $v_d$ and $v_q$ to the inverter 70. The inverter 70 respectively applies a U-phase voltage u, a V-phase voltage v, and a W-phase voltage w to the U-phase winding, the V-phase winding, and the W-phase winding of the permanent-magnet synchronous motor 100 to pass desired currents to the respective phase windings. At the previous stage of the inverter 70, there can be a circuit that generates pulse-width modulation (PWM) signals based on the voltage command values vu, vv, and vw and a gate driver that generates a gate driving signal for switching the transistor in the inverter 70 based on the PWM signals. These elements are well known, so that descriptions thereof are omitted for the sake of ease.

In the motor control apparatus 300 of the present disclosure, the amplitude $i_{d6}$ and the phase $\theta_{d6}$ of the d-axis 6th-order harmonic current and the amplitude $i_{q6}$ and the phase $\theta_{q6}$ of the q-axis 6th-order harmonic current have values that decrease the electrical angle 6th-order radial force as compared with a case in which both of the amplitude $i_{d6}$ and the amplitude $i_{q6}$ are zero and that decrease the electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force. Such calculation for determining the amplitudes $i_{d6}$ and $i_{q6}$ and the phases $\theta_{d6}$ and $\theta_{q6}$ can be executed using the above calculation expressions. Instead of executing such calculation in real time, the amplitudes $i_{d6}$ and $i_{q6}$ and the phases $\theta_{d6}$ and $\theta_{q6}$ may be determined by reading values from a prepared table according to various parameters determined depending on the electrical and mechanical characteristics of the motor and command values and detected values used for determining the 0th-order current.

Part or all of the components such as the first circuit 10, the second circuit 20, the third circuit 30, the vector control circuit 40, the first conversion circuit 50, and the second conversion circuit 60 can be implemented by an integrated circuit device. Such an integrated circuit device can be typically formed from one or a plurality of semiconductor components.

Figure 2:
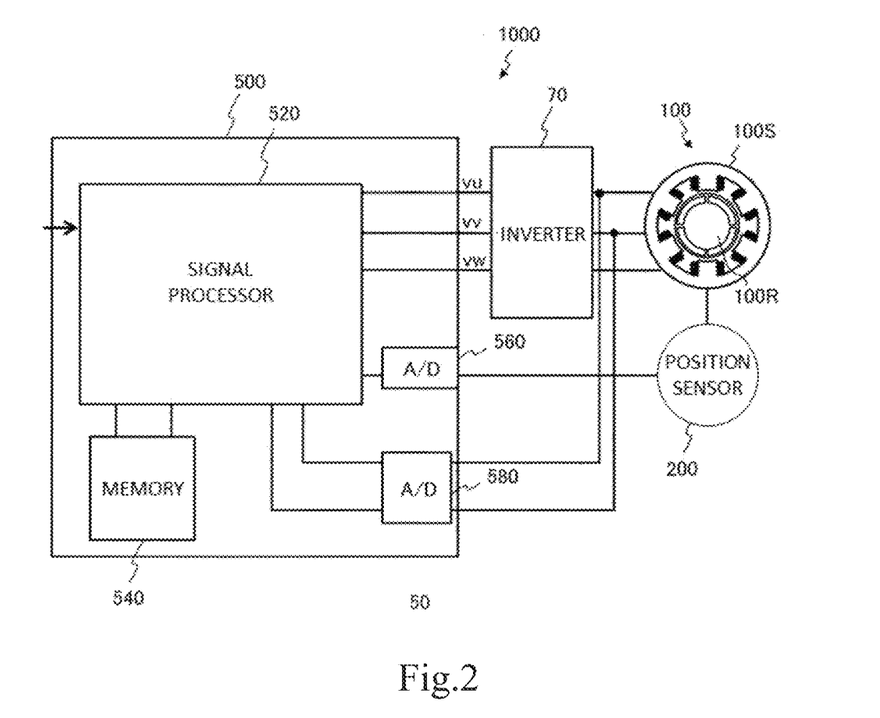
FIG. 2 is a schematic diagram illustrating the configuration of an integrated circuit device according to a non-limiting example embodiment of the present disclosure.

Referring to FIG. 2, a non-limiting example embodiment of the integrated circuit device of the present disclosure will be described. An integrated circuit device 500 illustrated in FIG. 2 includes a signal processor 520 and a memory 540. The memory 540 stores programs for causing the signal processor 520 to execute the following processing.

Processing for determining an d-axis 0th-order current and a q-axis 0th-order current Processing for determining an d-axis 6th-order harmonic current and a q-axis 6th-order harmonic current according to the position of the rotor Processing for determining a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value, respectively.

The amplitude $i_{d6}$ and the phase $\theta_{d6}$ of the d-axis 6th-order harmonic current and the amplitude $i_{q6}$ and the phase $\theta_{q6}$ of the q-axis 6th-order harmonic current have values that decrease the electrical angle 6th-order radial force as compared with a case in which both of the amplitude $i_{d6}$ and the amplitude $i_{q6}$ are zero and that decrease the electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force.

The integrated circuit device 500 includes an analog-to-digital (A/D) converter 560 that converts an analog signal from the position sensor 200 to a digital signal and an A/D converter 580 that converts an analog signal from a sensor (not illustrated) that detects a current flowing through the winding of the motor 100 to a digital signal.

The integrated circuit device 500 in this example outputs a PWM signal to be given to the inverter 70. At least part of the inverter 70 may be included in the integrated circuit device 500. Such an integrated circuit device 500 is typically implemented by connecting one or a plurality of semiconductor chips to one another in a single package. Part or the whole of the integrated circuit device 500 can be implemented by writing a program specific to the present disclosure to, for example, a general-purpose microcontroller unit (MCU).

Figure 3:
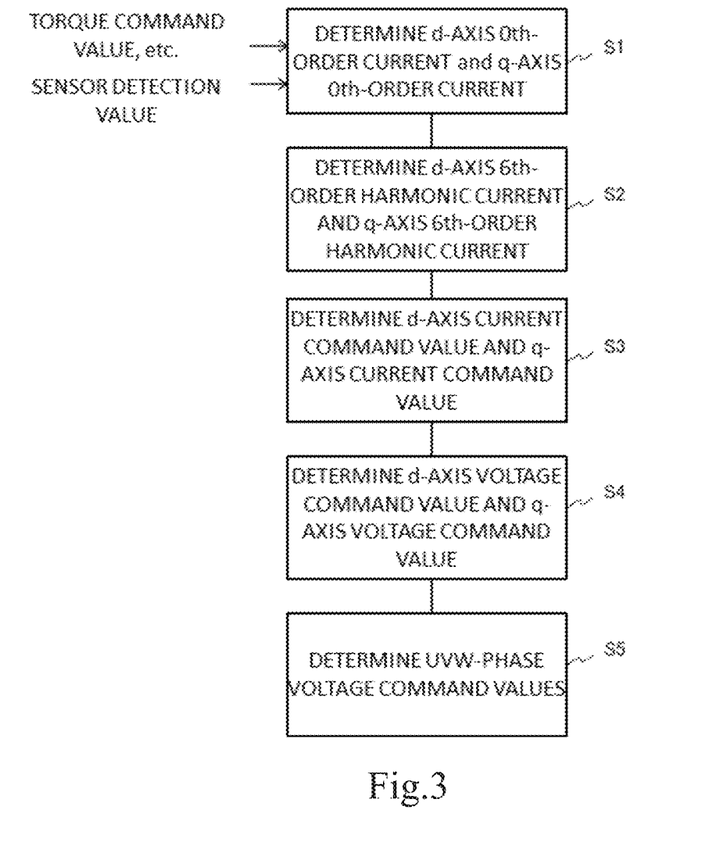
FIG. 3 is a flowchart illustrating a procedure of a motor control method according to an example embodiment of the present disclosure.

Referring to FIG. 3, an example embodiment of a motor control method of the present disclosure will be described.

First, in step S1, upon receiving a command value such as a torque command value and a detected value from the sensor, a d-axis 0th-order current and a q-axis 0th-order current are determined. In the determination, a table in which various command values and sensor detected values and command values on the d-axis 0th-order current and the q-axis 0th-order current are associated with other may be used. Such a table can be stored in a memory that the motor control apparatus has built-in. The magnitudes of the d-axis 0th-order current and the q-axis 0th-order current can be determined based on, for example, the torque command value, the motor rotational speed, or the motor applied voltage. Alternatively, the magnitudes of the d-axis 0th-order current and the q-axis 0th-order current may be determined based on a speed command output from a speed controller (not illustrated), the actual speed, or the like.

In step S2, the d-axis 6th-order harmonic current and the q-axis 6th-order harmonic current are determined depending on the position of the rotor. In step S2, the amplitude $i_{d6}$ and the phase $\theta_{d6}$ of the d-axis 6th-order harmonic current and the amplitude $i_{q6}$ and the phase $\theta_{q6}$ of the q-axis 6th-order harmonic current are determined so as to decrease the electrical angle 6th-order radial force as compared with a case in which no harmonic current is superposed and to decrease the electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force. In the determination, a table in which the amplitude and the phase of the harmonic current are associated with, for example, the position of the rotor, may be used. Such a table can be stored in a memory built in the motor control apparatus.

In step S3, a value obtained by superposing the d-axis 6th-order harmonic current on the d-axis 0th-order current and a value obtained by superposing the q-axis 6th-order harmonic current on the q-axis 0th-order current are respectively determined as a d-axis current command value and a q-axis current command value.

In step S4, a d-axis voltage command value and a q-axis voltage command value are respectively determined based on the d-axis current command value and the q-axis current command value.

In step S5, the respective voltage command values of the U-, V-, and W-phases are determined based on the d-axis voltage command value and the q-axis voltage command value.

The inventors performed a simulation and actual measurement of vibration on a surface permanent-magnet synchronous motor with a 8-pole 12-slot concentrated winding. In the simulation, an architectural analysis was performed using the result of a magnetic field analysis using electromagnetic field analytical software.

The magnetic field analysis and the architectural analysis were performed at a motor rotational speed of 2,000 [rpm] to examine the tendency of vibration reduction using different B- and q-axis 6th-order command values. The d- and q-axis 0th-order currents for obtaining a predetermined torque was a value determined based on a torque-rotational speed (T-N) curve. The B- and q-axis 0th-order currents and the 6th-order harmonic current are given by Eq. 10.

In this simulation, the values of the amplitude and the phase of the 6th-order harmonic were determined to satisfy all the above relations in order to prevent the electrical angle 8th-order radial force from increasing. Specifically, the following values were employed.

$$\theta_{d6}=90°, \theta_{q6}=270°, i_{d6}=i_{q6}=1.5\ [A] \qquad [\text{Eq. 21}]$$

In this example, both of the 0th-order component $L_{d0}$ of d-axis self-inductance and the 0th-order component $L_{q0}$ of q-axis self-inductance that appear in the constraint condition in Eq. 12 were about 40 microHenry [µH], so that $L_{d0}$ was equal to $L_{q0}$.

In the experiment, the motor was mounted on a motor bench, a three-axis accelerometer was fixed to the motor housing with an adhesive, and the vibration was measured. When a vibration tracking analysis was performed from 0 to 3,000 [rpm] at command values for 0th-order currents on the d- and q-axes, electrical angle 6th-order vibration enters a resonant mode at 500 to 800 [Hz], with the motor rotational speed in the range from 1,400 to 2,000 [rpm]. In this example, the vibration was evaluated, in view of the resonant mode, using the d- and q-axis 6th-order current command values estimated in the simulation.

The d- and q-axis 0th-order current command values are shown in Eq. 22.

$$\begin{bmatrix} i_d \\ i_q \end{bmatrix} = \begin{bmatrix} -106.02 \\ 88.96 \end{bmatrix} \qquad [\text{Eq. 22}]$$

The d- and q-axis 6th-order harmonic current command values are shown in Eq. 23.

$$\begin{bmatrix} i_d \\ i_q \end{bmatrix} = \begin{bmatrix} -106.02 + 1.5\cos(6\theta+90°) \\ 88.96 + 1.5\sin(6\theta+270°) \end{bmatrix} \qquad [\text{Eq. 23}]$$

First, an experiment was performed at a constant rotational speed of 2,000 [rpm] to evaluate the beneficial effects of addition of the 6th-order harmonic current command values.

Figure 4A:
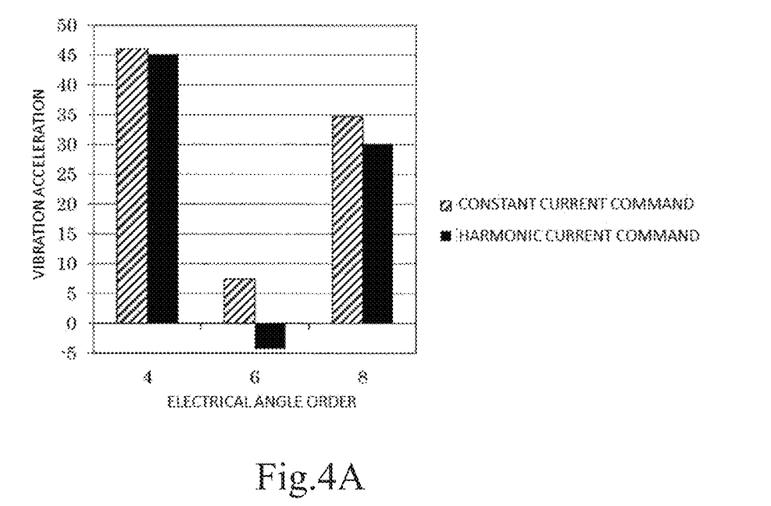
FIG. 4A is a graph showing the result of a simulation in an example of the present disclosure.

FIG. 4A is a graph showing the result of the simulation of this example. The horizontal axis of the graph indicates the electrical angle order of the vibration, and the vertical axis indicates the vibration acceleration. In the graph, the height of the "constant current command" bar indicates the magnitude of the vibration of the motor (calculation result) when a 6th-order harmonic current is not superposed (only the d- and q-axis 0th-order currents). The height of the "harmonic current command" bar indicates the magnitude of the vibration of the motor (calculation result) when the electrical angle 6th-order harmonic current (Eq. 23) in the example is superposed on the d- and q-axis 0th-order currents. As can be seen from FIG. 4A, the electrical angle 4th-, 6th-, and 8th-order vibrations were reduced. The reason why the vibrations of these orders are reduced is that the radial forces of the corresponding orders are reduced.

Figure 4B:
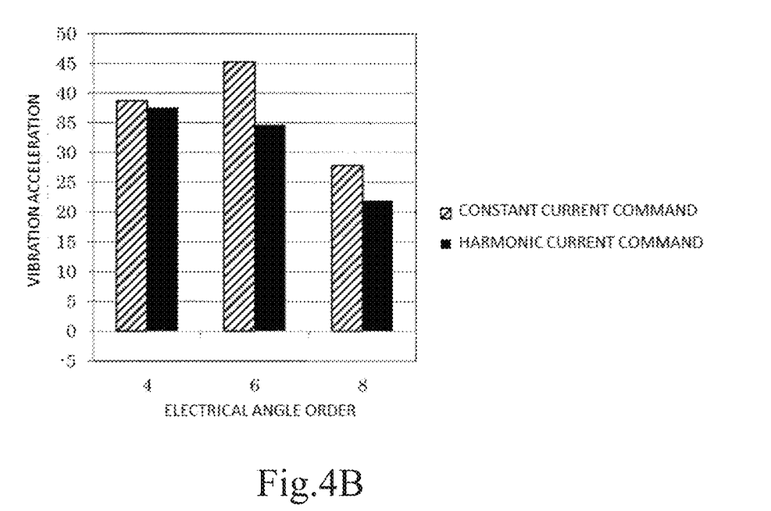
FIG. 4B is a graph showing an actual measurement result in an example of the present disclosure.

FIG. 4B shows the actual measurement result of this example. The horizontal axis and the vertical axis of the graph are the same as the horizontal axis and the vertical axis of the graph in FIG. 4A. The "vibration acceleration" on the vertical axis indicates the values measured by an acceleration sensor attached to the motor. In this graph, the height of the "constant current command" bar indicates the magnitude of the vibration of the motor (measured value) measured when the electrical angle 6th-order harmonic current is not superposed (only the d- and q-axis 0th-order currents). The height of the "harmonic current command" bar indicates the magnitude of the vibration of the motor (measured value) measured when the electrical angle 6th-order harmonic current is superposed on the d- and q-axis 0th-order currents in this example. As can be seen from FIG. 4B, when the electrical angle 6th-order harmonic current (Eq. 23) of this example is superposed on the d- and q-axis 0th-order currents, the electrical angle 6th-order vibration can be reduced without an increase in the electrical angle 4th- and 8th-order vibrations. Specifically, it was confirmed that the electrical angle 6th-order vibration was reduced by 10 [dB]. The cause of the increase in the actual electrical angle 6th-order vibration was larger than the electrical angle 6th-order vibration obtained by the simulation is because the permanent-magnet synchronous motor fixed to the motor bench resonated with the electrical angle 6th-order vibration.

Since the motor control apparatus, the motor control method, the motor system, and the integrated circuit device of the present disclosure can achieve vibration reduction of the motor by current control, they can be widely used in apparatuses or systems including various permanent-magnet synchronous motors and permanent magnet motors.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control apparatus that controls a permanent-magnet synchronous motor including a rotor and a stator, the apparatus comprising:
a first circuit that determines a d-axis 0th-order current and a q-axis 0th-order current;
a second circuit that determines a d-axis 6th-order harmonic current and a q-axis 6th-order harmonic current according to a position of the rotor; and
a third circuit that determines, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value; wherein
an amplitude $i_{d6}$ and a phase $\theta_{d6}$ of the d-axis 6th-order harmonic current and an amplitude $i_{q6}$ and a phase $\theta_{q6}$ of the q-axis 6th-order harmonic current have values that decrease an electrical angle 6th-order radial force as compared with a case in which both of the amplitude $i_{d6}$ and the amplitude $i_{q6}$ are zero and decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force.

2. The motor control apparatus according to claim 1, wherein
$L_{d0} \times i_{d6}$ is equal to $L_{q0} \times i_{q6}$, where $L_{d0}$ is a 0th-order component of a d-axis self-inductance and $L_{q0}$ is a 0th-order component of a q-axis self-inductance; and
a difference between the phase $\theta_{d6}$ of the d-axis 6th-order harmonic current and the phase $\theta_{q6}$ of the q-axis 6th-order harmonic current is equal to $\pi$.

3. The motor control apparatus according to claim 2, wherein the amplitude $i_{d6}$ and the phase $\theta_{d6}$ of the d-axis 6th-order harmonic current each have a value that provides an electrical angle 6th-order radial force opposite in phase to a 6th-order radial force that is generated between the rotor and the stator when the d-axis 0th-order current and the q-axis 0th-order current flow through a winding of the stator.

4. The motor control apparatus according to claim 3, wherein
when the electrical angle 6th-order radial force that is generated between the rotor and the stator when the d-axis 0th-order current and the q-axis 0th-order current flow through the winding of the stator is expressed as $f_{r6} \cdot \cos(6\theta + \theta_{r6})$; and
when the electrical angle 6th-order radial force opposite in phase generated between the rotor and the stator by superposition of the d-axis 6th-order harmonic current and the q-axis 6th-order harmonic current is expressed as $F_{d6} \cdot i_{d6} \cos(6\theta + \theta_{d6}) + F_{q6} \cdot i_{q6} \cos(6\theta + \theta_{q6})$, where $F_{d6}$ and $F_{q6}$ are constants determined depending on a motor driving condition, values on a left-hand side are equal to values on a right-hand side in an equation:

$$f_{r6} = -i_{d6}\sqrt{F_{d6}^2 + \left(F_{q6}\frac{L_{d0}}{L_{q0}}\right)^2}$$

$$\theta_{r6} = \tan^{-1}\left\{\frac{F_{d6}\sin(\theta_{d6}) + \left(F_{q6}\frac{L_{d0}}{L_{q0}}\right)\cos(\theta_{d6})}{F_{d6}\cos(\theta_{d6}) - \left(F_{q6}\frac{L_{d0}}{L_{q0}}\right)\sin(\theta_{d6})}\right\}.$$

5. A motor system comprising:
the motor control apparatus according to claim 1; and
a permanent-magnet synchronous motor including a rotor and a stator.

6. A motor control method for controlling a permanent-magnet synchronous motor including a rotor and a stator, the method comprising the steps of:
determining a d-axis 0th-order current and a q-axis 0th-order current;
determining a d-axis 6th-order harmonic current and a q-axis 6th-order harmonic current according to a position of the rotor, the step determining the amplitudes $i_{d6}$ and $i_{q6}$ and the phases $\theta_{d6}$ and $\theta_{q6}$ so as to decrease an electrical angle 6th-order radial force as compared with a case in which both of the amplitude $i_{d6}$ and the amplitude $i_{q6}$ are zero and to decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force; and determining, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value.

7. An integrated circuit device to control a permanent-magnet synchronous motor including a rotor and a stator, the integrated circuit device comprising:
   a signal processor; and
   a memory; wherein
   the memory stores a program to cause the signal processor to execute:
      determining a d-axis 0th-order current and a q-axis 0th-order current;
      determining a d-axis 6th-order harmonic current and a q-axis 6th-order harmonic current according to a position of the rotor; and
      determining, respectively, a value obtained by superposing the d-axis 6th-order harmonic current on the d-axis 0th-order current and a value obtained by superposing the q-axis 6th-order harmonic current on the q-axis 0th-order current as a d-axis current command value and a q-axis current command value; wherein
   an amplitude $i_{d6}$ and a phase $\theta_{d6}$ of the d-axis 6th-order harmonic current and an amplitude $i_{q6}$ and a phase $\theta_{q6}$ of the q-axis 6th-order harmonic current have values that decrease an electrical angle 6th-order radial force as compared with a case in which both of the amplitude $i_{d6}$ and the amplitude $i_{q6}$ are zero and decrease an electrical angle 8th-order radial force as compared with a case in which the amplitudes $i_{d6}$ and $i_{q6}$ and the phases $\theta_{d6}$ and $\theta_{q6}$ are values that minimize the electrical angle 6th-order radial force.

* * * * *